United States Patent
Arata (10) Patent No.: US 11,130,428 B2
(45) Date of Patent: Sep. 28, 2021

(54) VEHICLE SEAT HAVING SEAT CUSHION OF REDUCED THICKNESS

(71) Applicant: TACHI-S CO., LTD., Tokyo (JP)

(72) Inventor: Kazuyoshi Arata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 68 days.

(21) Appl. No.: 16/690,617

(22) Filed: Nov. 21, 2019

(65) Prior Publication Data

US 2020/0180477 A1 Jun. 11, 2020

(30) Foreign Application Priority Data

Dec. 5, 2018 (JP) .............................. JP2018-228189

(51) Int. Cl.
*B60N 2/427* (2006.01)
*B60N 2/56* (2006.01)
*B60N 2/70* (2006.01)

(52) U.S. Cl.
CPC ....... *B60N 2/42718* (2013.01); *B60N 2/5657* (2013.01); *B60N 2/7094* (2013.01)

(58) Field of Classification Search
CPC ...... B60N 2/7094; B60N 2/72; B60N 2/5657; B60N 2/42718

USPC .......................................... 297/452.27, 216.1
See application file for complete search history.

(56) References Cited

U.S. PATENT DOCUMENTS

| | | | |
|---|---|---|---|
| 9,623,777 B2 * | 4/2017 | Sammons | ................ B60N 2/72 |
| 2003/0102699 A1 | 6/2003 | Aoki et al. | |
| 2006/0273650 A1 * | 12/2006 | Embach | ................... B60N 2/70 |
| | | | 297/452.27 |

FOREIGN PATENT DOCUMENTS

| | | |
|---|---|---|
| JP | 2003-165325 A | 6/2003 |
| JP | 2012-105816 A | 6/2012 |

\* cited by examiner

*Primary Examiner* — Milton Nelson, Jr.
(74) *Attorney, Agent, or Firm* — Paratus Law Group, PLLC (57) ABSTRACT

A vehicle seat includes a seat cushion including: a pad; and a support portion which supports the pad. The support portion deforms in accordance with a load applied to the pad, and allows sinking of the pad due to the deformation, and a deformation amount per unit load of the support portion, in a high load range equal to or greater than a predetermined load, is smaller than a deformation amount per unit load of the support portion, in a low load range less than a predetermined load.

6 Claims, 8 Drawing Sheets

VEHICLE SEAT HAVING SEAT CUSHION OF REDUCED THICKNESS

CROSS-REFERENCE TO RELATED APPLICATION(S)

This application is based upon and claims the benefit of priority from Japanese Patent Application No. 2018-228189, filed on Dec. 5, 2018, the entire contents of which are incorporated herein by reference.

BACKGROUND

1. Field of the Invention

The present invention relates to a vehicle seat.

2. Description of the Related Art

A seat cushion of a seat installed in a vehicle such as an automobile includes a pad and a frame which supports the pad. The frame typically includes a pair of side frames, a front frame and a rear frame which connect the pair of side frames, and a plurality of springs bridged between the front frame and the rear frame. When a load from a seated person is applied to the pad and the spring deflects in accordance with the load applied to the pad, the pad sinks and a cushioning property is enhanced.

A seat has also been known, which further includes a chamber covered by a pad and a fan for feeding air to the chamber, and which enhances seating comfort by an air conditioning which blows air from a surface of the seat cushion through the pad (see, for example, JP-A-2003-165325 and JP-A-2012-105816).

A storage space, for example, is provided lower than the seat cushion, and can be enlarged by reducing a thickness of the seat cushion. The seat cushion tends to be thick due to installation of a chamber in a seat in which the chamber for air conditioning is installed, and thus it is particularly desired to reduce the thickness of the seat cushion. As one of measures for reducing the thickness of the seat cushion, it is conceivable to reduce the thickness of the pad.

However, when the thickness of the pad is decreased, the cushioning property decreases. It is possible to compensate for a decrease in the cushioning property with a decrease in the thickness of the pad by reducing a spring constant of the plurality of springs supporting the pad. However, the pad may be excessively sunk. A height of a hip point of the seated person is generally defined in relation to a field of vision provided to the seated person. When the pad is excessively sunk, the field of vision of the seated person may be narrowed due to changes in the hip point and the storage space lower than the seat cushion may be compressed.

SUMMARY

The present invention has been made in view of the above circumstances, and an object thereof is to reduce the thickness of a seat cushion without impairing functions thereof.

A vehicle seat according to an aspect of the present invention includes a seat cushion including a pad and a support portion which supports the pad, in which the support portion deforms in accordance with a load applied to the pad and allows sinking of the pad due to deformation, a deformation amount per unit load of the support portion, in a high load range equal to or greater than a predetermined load, is smaller than a deformation amount per unit load of the support portion, in a low load range less than a predetermined load.

According to the present invention, it is possible to reduce a thickness of the seat cushion without impairing functions thereof.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
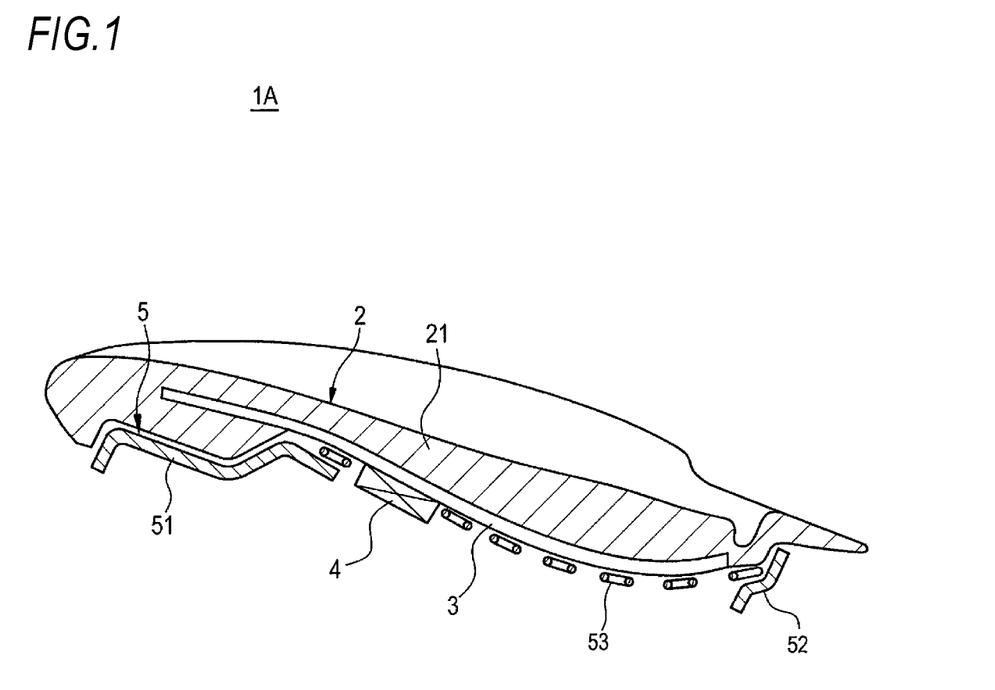
FIG. 1 is a cross-sectional view of an example of a vehicle seat for describing an embodiment of the present invention.
Figure 2:
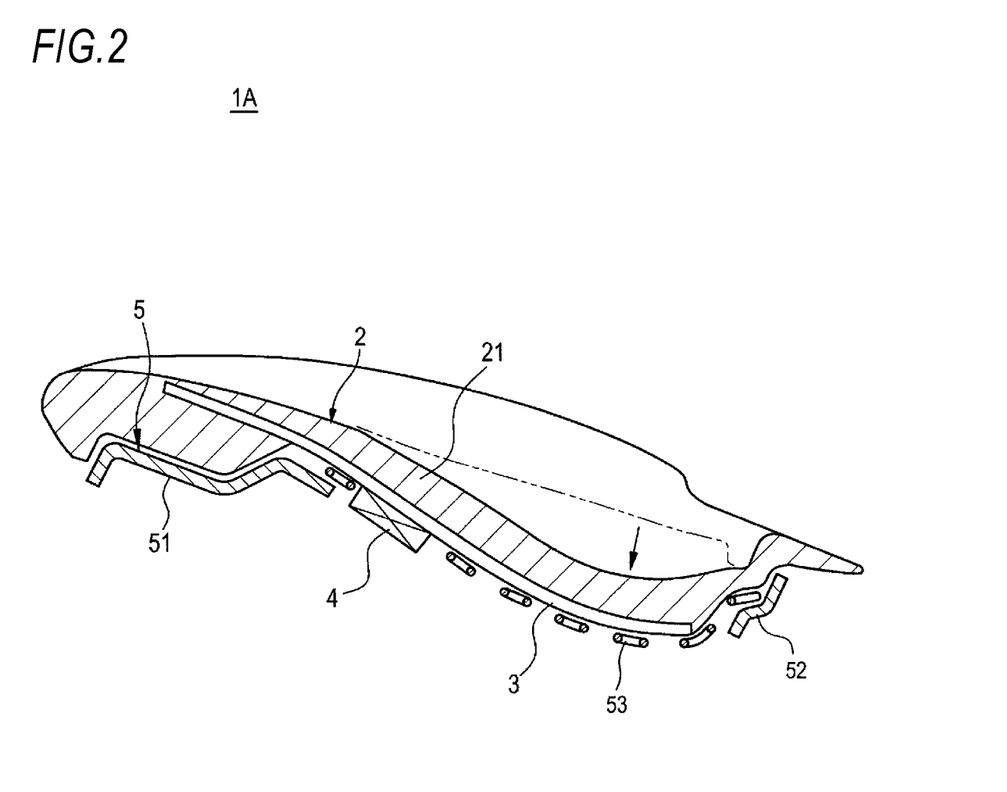
FIG. 2 is a cross-sectional view of the vehicle seat of FIG. 1 whose pad is in a sunken state.

FIGS. 1 and 2 show an example of a vehicle seat for describing an embodiment of the present invention.

A vehicle seat 1A (hereinafter, also simply referred to as a seat) shown in FIG. 1 is, for example, a seat installed in a vehicle such as an automobile, and includes a seat cushion 2 which supports buttocks and thighs of an occupant seated on the seat 1A (hereinafter, referred to as a seated person), and a seat back (not shown) which supports a waist and a back of the seated person.

The seat cushion 2 includes a pad 21 formed of a foamed material such as urethane foam and a frame 5 which supports the pad 21, and further includes a chamber 3 whose side close to a surface of the seat cushion 2 is covered by the pad 21, and a fan 4 which feeds air to the chamber 3 in the example shown in FIGS. 1 and 2. The air fed to the chamber 3 by the fan 4 circulates through the chamber 3 and can be blown from a surface of the seat cushion 2 through the pad 21. When the air is blown from the surface of the seat cushion 2, temperature and humidity of the surface of the seat cushion 2 in contact with the seated person are adjusted. The pad 21 is covered by a trim cover formed of, for example, leather, textiles, and knitted fabric. When the trim cover is formed of leather among these, a large number of air holes are disposed on the trim cover in a penetration manner, and ventilation of the trim cover is ensured.

The frame 5 includes a front frame 51 and a rear frame 52 which connect a pair of side frames (not shown), and a plurality of springs 53 bridged between the front frame 51 and the rear frame 52. The front frame 51 is disposed lower than the pad 21 and the chamber 3 on a front side of the seat cushion 2, and front portions of the pad 21 and the chamber 3 are supported by the front frame 51. The plurality of springs 53 are disposed lower than the pad 21 and the chamber 3 on a rear side of the seat cushion 2, and rear portions of the pad 21 and the chamber 3 are supported by the plurality of springs 53.

As shown in FIG. 2, when the load from the seated person is applied to the seat cushion 2, the pad 21 is compressed. Further, the pad 21 and the chamber 3 are elastically supported by the plurality of springs 53 on the rear side of the seat cushion 2 which supports the buttocks of the seated person and is subjected to a relatively high load, and the rear portions of the pad 21 and the chamber 3 sink downward with deflection of the plurality of springs 53.

In the example shown in FIGS. 1 and 2, a lower surface of the chamber 3 at the rear portion thereof facing a spring 53 side is exposed. Alternatively, the lower surface of the chamber 3 at the rear portion thereof may also be covered by the pad 21. However, the lower surface of the chamber 3 at the rear portion thereof is preferably exposed, from the viewpoint of preventing an increase in the thickness of the seat cushion 2 with the installation of the chamber 3.

Figure 3:
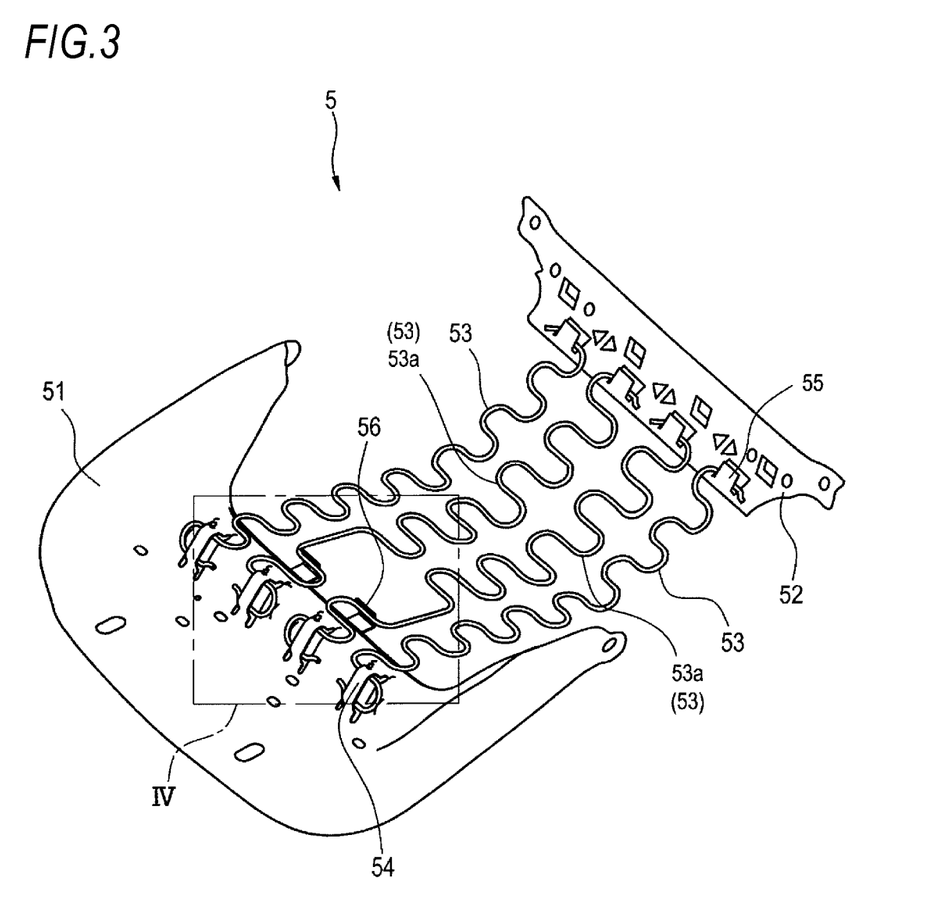
FIG. 3 is a perspective view of an example of a support portion which supports a pad of the vehicle seat of FIG. 1.
Figure 4:
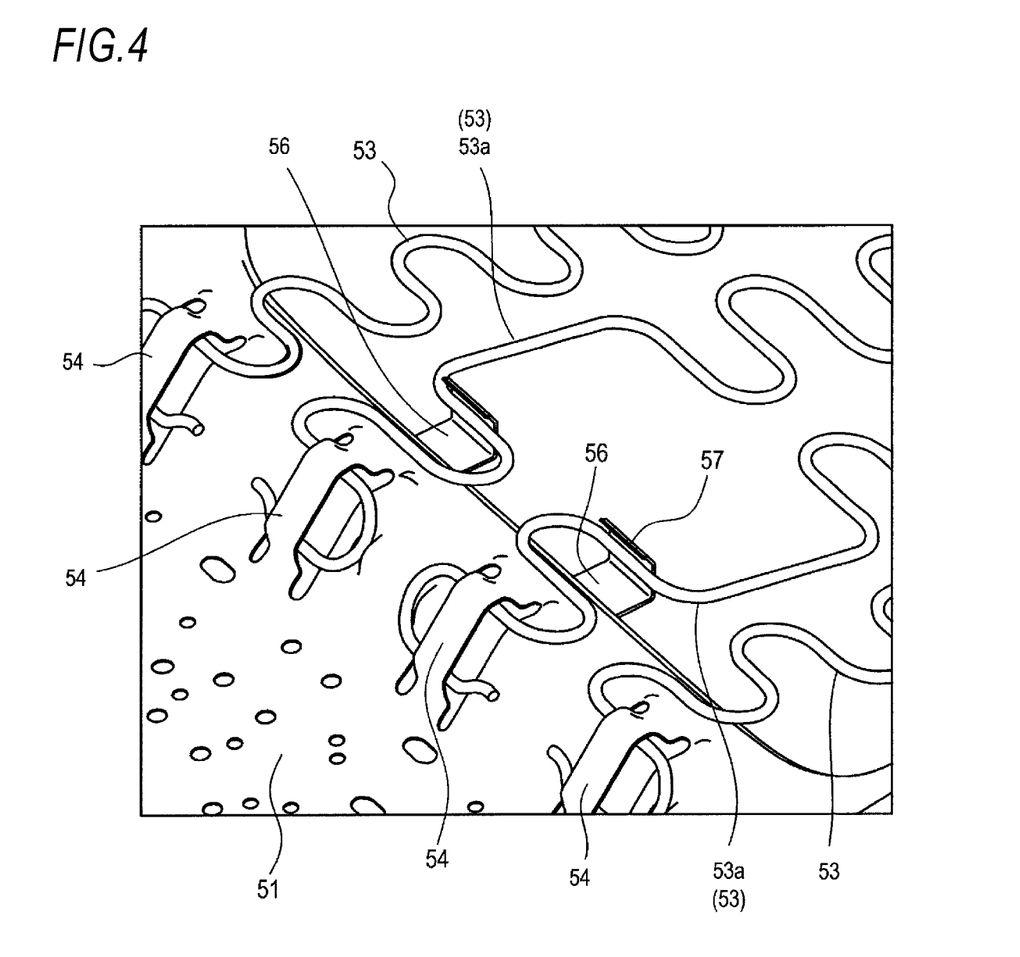
FIG. 4 is an enlarged view of a part surrounded by a rectangular frame IV in FIG. 3.

FIGS. 3 and 4 show an example of a support portion including the plurality of springs 53.

As described above, the rear portions of the pad 21 and the chamber 3 are supported by the plurality of springs 53 bridged between the front frame 51 and the rear frame 52, and are supported by four springs 53 in the example shown in FIGS. 3 and 4. The spring 53 is formed by bending a wire member formed of metal into a wave shape and a planar shape, and can extend and contract in a front-rear direction of the seat cushion 2. A front end portion of the spring 53 is fixed to a fixing portion 54 of the front frame 51, and a rear end portion of the spring 53 is fixed to a fixing portion 55 of the rear frame 52.

The front frame 51 includes two engagement portions 56 which can be engaged with intermediate portions of two springs 53a disposed at the center among the four springs 53. Each of the engagement portions 56 extends rearward from the fixing portion 54 which is fixed to the front end portion of the spring 53a and is disposed lower than the spring 53a. A hook portion 57 is provided at a tip end portion of each of the engagement portions 56, and the hook portion 57 can be engaged with a straight portion between two U-shaped bent portions of the spring 53a. However, the spring 53a is disengaged from the hook portion 57 when the load from the seated person is not applied to the spring 53a.

Figure 5A:
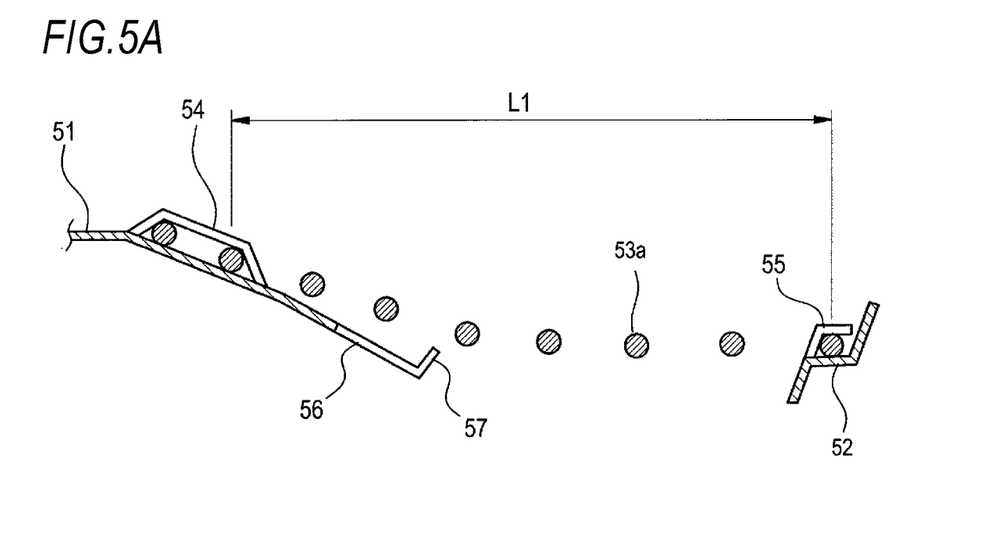
FIGS. 5A and 5B are schematic views showing an action of the support portion of FIG. 3.
Figure 5B:
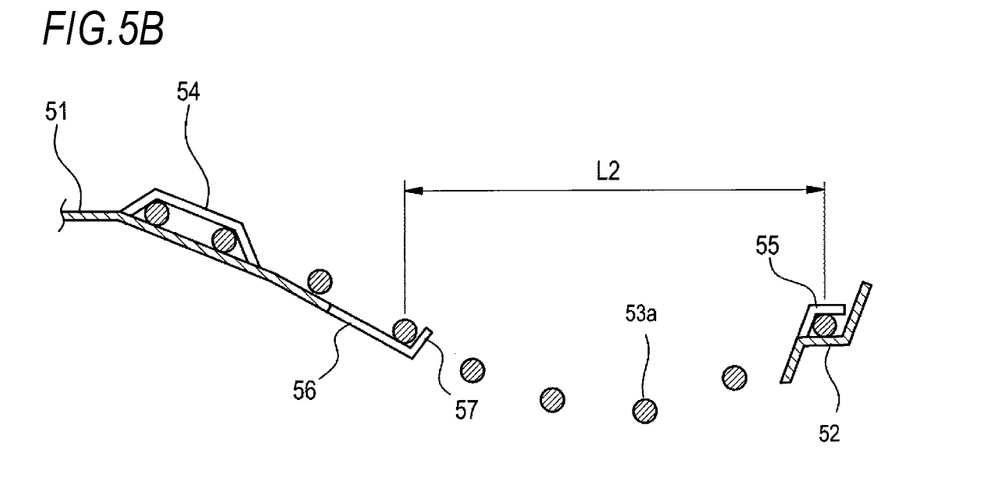
Figure 6:
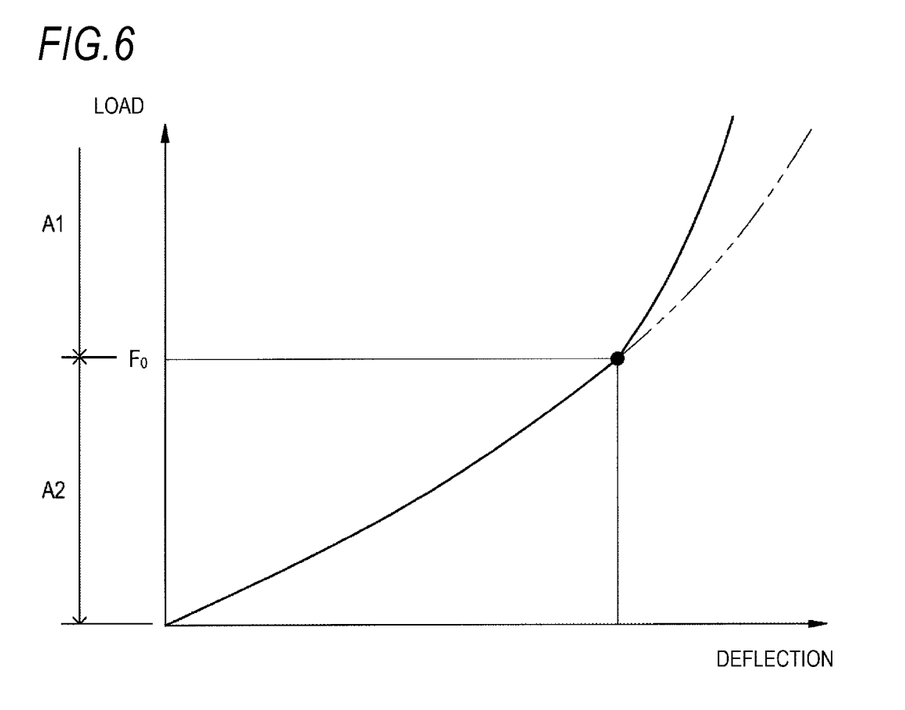
FIG. 6 is a load-deflection graph of the support portion of FIG. 3.

FIGS. 5 and 6 show an action of the support portion shown in FIGS. 3 and 4. FIG. 5A shows a state where the load from the seated person is not applied to the plurality of springs 53 including the spring 53a, and FIG. 5B shows a state where the load from the seated person is applied to the plurality of springs 53.

As shown in FIG. 5A, the spring 53a is disengaged from the hook portion 57 of the engagement portion 56 when the load from the seated person is not applied to the plurality of springs 53 including the spring 53a. Therefore, a deflectable effective length of the spring 53a is a length L1 of a section disposed between the fixing portion 54 of the front frame 51 and the fixing portion 55 of the rear frame 52.

As shown in FIG. 5B, deflection is generated in the plurality of springs 53 including the two springs 53a when the load from the seated person is applied to the plurality of springs 53. When the load from the seated person is equal to or greater than a predetermined load and deflection generated in the spring 53a reaches deflection corresponding to the predetermined load, the hook portion 57 of the engagement portion 56 is engaged with the spring 53a. When the hook portion 57 is engaged with the spring 53a, a section of the spring 53a disposed between the fixing portion 54 of the front frame 51 and the hook portion 57 is prevented from deflecting. Therefore, the deflectable effective length of the spring 53a is reduced to a length L2 (L1>L2) of a section disposed between the hook portion 57 and the fixing portion 55 of the rear frame 52.

In this way, the engagement portion 56 is engaged with the spring 53a based on the deflection of the spring 53a, and the deflectable effective length of the spring 53a is reduced from L1 to L2. The deflectable effective length of the spring 53a is reduced, so that the amount of deflection of the spring 53a per unit load is reduced. Therefore, as shown in FIG. 6, the amount of deflection per unit load of the plurality of springs 53 in the high load range A1 equal to or greater than a predetermined load $F_0$ is smaller than the amount of deflection per unit load of the plurality of springs 53 in the low load range A2 less than the predetermined load $F_0$. In the low load range A2, the rear portions of the pad 21 and the chamber 3 sink relatively easily, and thus the pad 21 can be made thin while maintaining the cushioning property. On the other hand, the rear portions of the pad 21 and the chamber 3 are prevented from sinking in the high load range A1, so that the hip point of the seated person can be maintained at an appropriate height and a space lower than the seat cushion 2 can be prevented from being compressed.

The predetermined load $F_0$, at which the amount of deflection per unit load of the plurality of springs 53 changes, can be set based on an interval between the spring 53a and the hook portion 57 of the engagement portion 56 when the load from the seated person is not applied to the plurality of springs 53. The amount of deflection per unit load of the plurality of springs 53 in the high load range A1 equal to or greater than the predetermined load $F_0$ can be set based on the number of springs 53a, whose deflectable effective length is reduced to L2 by the engagement portion 56, and the deflectable effective length L2 of the spring 53a. The engagement portions 56 are provided on the front frame 51 in the example shown in FIGS. 3 and 4, and may be provided on the rear frame 52.

The engagement portions 56 may be provided separately on the front frame 51 and the rear frame 52, and may be attached to the spring 53a. The engagement portion 56 shown in FIGS. 7A and 7B extends along the spring 53a, and the hook portion 57 is provided at one end portion of the engagement portion 56, and an attachment portion 58 attached to the spring 53a is provided at the other end portion of the engagement portion 56.

Figure 7A:
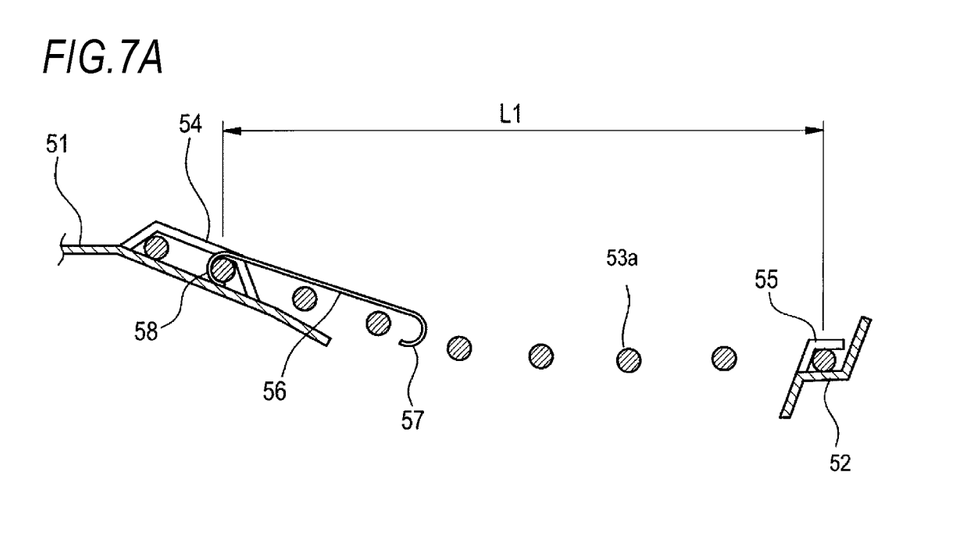
FIGS. 7A and 7B are schematic views of a modification of the support portion of FIG. 3.

As shown in FIG. 7A, the spring 53a is disengaged from the hook portion 57 of the engagement portion 56 when the load from the seated person is not applied to the plurality of springs 53 including the spring 53a. The deflectable effective length of the spring 53a is the length L1 of the section between the fixing portion 54 of the front frame 51 and the fixing portion 55 of the rear frame 52.

Figure 7B:
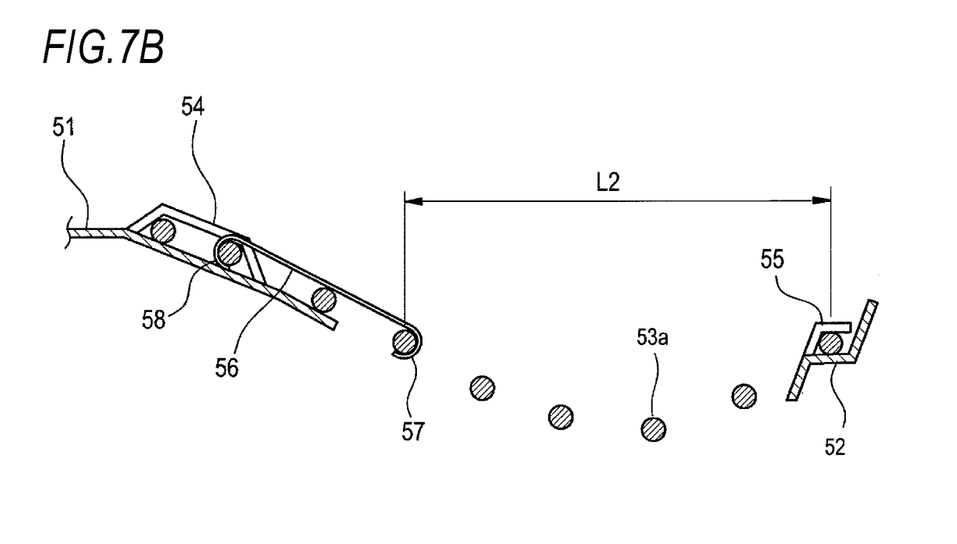

As shown in FIG. 7B, when the deflection generated in the spring 53a reaches the deflection corresponding to the predetermined load in a state where the load from the seated person is applied to the plurality of springs 53, the hook portion 57 of the engagement portion 56 is engaged with the spring 53a. When the hook portion 57 is engaged with the spring 53a, a section of the spring 53a disposed between the attachment portion 58 of the engagement portion 56 and the hook portion 57 is restrained by the engagement portion 56, and deflection thereof is prevented. Therefore, the deflectable effective length of the spring 53a is reduced to the length L2 (L1>L2) of a section excluding the section constrained by the engagement portion 56.

According to the engagement portion 56 attached to the spring 53a, the existing front frame 51 and the rear frame 52 can be used.

Figure 8:
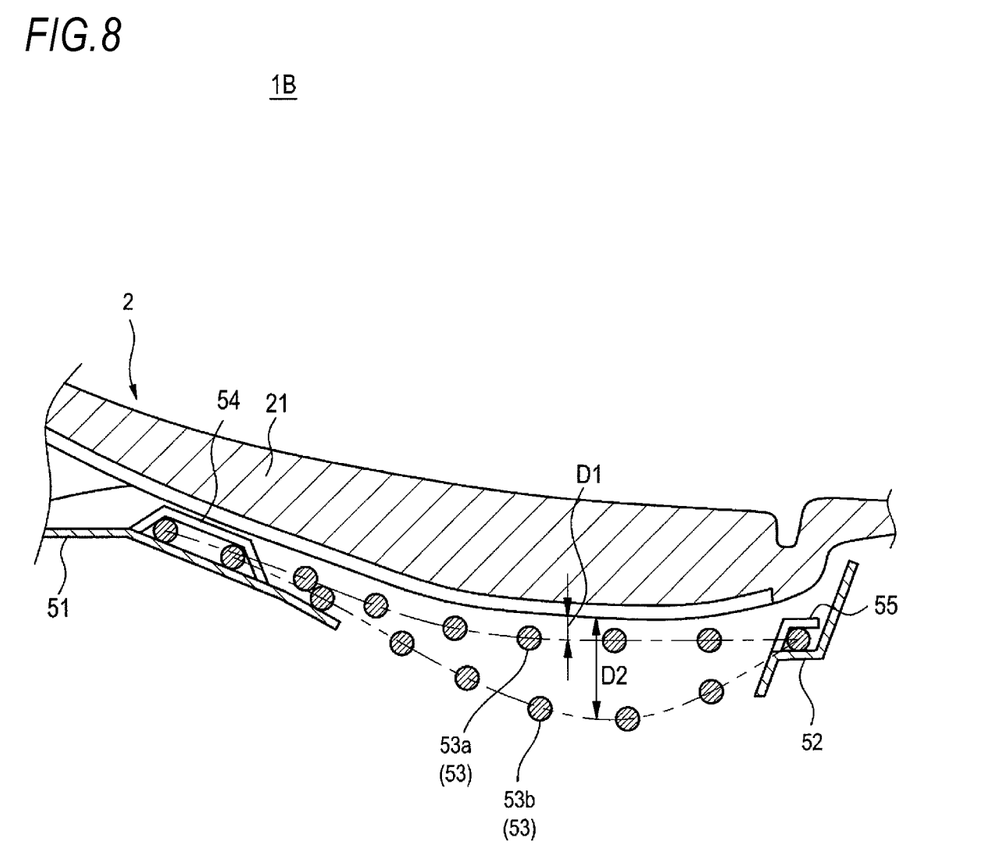
FIG. 8 is a schematic view of another example of a support portion for describing an embodiment of the present invention.

FIG. 8 shows another example of a vehicle seat for describing an embodiment of the present invention. Elements common to those of the vehicle seat 1A described above are denoted by common reference numerals, and descriptions thereof are omitted or simplified.

In a vehicle seat 1B shown in FIG. 8, similar to the vehicle seat 1A described above, the rear portions of the pad 21 and the chamber 3 are supported by a plurality of springs 53 bridged between the front frame 51 and the rear frame 52. When the load from the seated person is applied to the seat cushion 2, the rear portions of the pad 21 and the chamber 3 sink downward with the deflection of the plurality of springs 53.

In the vehicle seat 1B, a natural length of a spring 53b among the plurality of springs 53 which supports the pad 21 and the chamber 3 is longer than a natural length of another spring 53a, and the relatively long spring 53b is bent downward and bridged between the front frame 51 and the rear frame 52. When the load from the seated person is not applied, the relatively long spring 53b is disposed farther from the pad 21 and the chamber 3 as compared with the relatively short spring 53a (D1<D2).

In the low load range less than the predetermined load, the pad 21 and the chamber 3 are supported by the relatively short spring 53a and sink downward with the deflection of the spring 53a. When the deflection generated in the spring 53a reaches the deflection corresponding to the predetermined load, the pad 21 and the chamber 3 come into contact with the relatively long spring 53b. In the high load range equal to or greater than the predetermined load, the pad 21 and the chamber 3 are supported by the spring 53a and the spring 53b, and sink downward with the deflection of the spring 53a and the spring 53b. Therefore, the amount of deflection per unit load of the plurality of springs 53 in the high load range greater than or equal to the predetermined load is smaller than the amount of deflection per unit load of the plurality of springs 53 in the low load range less than the predetermined load. In the low load range, the rear portions of the pad 21 and the chamber 3 sink relatively easily, and thus the pad 21 can be made thin while maintaining the cushioning property. On the other hand, the rear portions of the pad 21 and the chamber 3 are prevented from sinking in the high load range, so that the hip point of the seated person can be maintained at an appropriate height and the space lower than the seat cushion 2 can be prevented from being compressed.

Although the present invention has been described with reference to the seats 1A and 1B installed in a vehicle such as an automobile, the present invention is also applicable to a vehicle seat other than a vehicle, such as a ship or an aircraft.

As described above, the vehicle seat disclosed in the present specification includes a seat cushion including a pad and a support portion which supports the pad. The support portion deforms in accordance with a load applied to the pad and allows sinking of the pad due to deformation, and a deformation amount per unit load of the support portion in a high load range equal to or greater than a predetermined load is smaller than a deformation amount per unit load of the support portion in a low load range less than a predetermined load.

Further, in the vehicle seat disclosed in the present specification, the support portion includes a front frame disposed on a front side of the seat cushion, a rear frame disposed on a rear side of the seat cushion, a plurality of springs which are bridged between the front frame and the rear frame on the lower side of the pad and deflect in accordance with a load applied to the pad, and an engagement portion which is engaged with one or more of the plurality of springs and changes a deflectable effective length of the spring, based on the deflection of the plurality of springs.

In the vehicle seat disclosed in the present specification, the engagement portion is provided on at least one of the front frame and the rear frame, and the intermediate portion of the spring is fastened to the frame.

In the vehicle seat disclosed in the present specification, the engagement portion restrains a partial section of the spring in length.

In the vehicle seat disclosed in the present specification, the support portion includes a front frame disposed on a front side of the seat cushion, a rear frame disposed on a rear side of the seat cushion, and a plurality of springs which are bridged between the front frame and the rear frame on the lower side of the pad and deflect in accordance with load applied to the pad, in which some of the plurality of springs are spaced apart from the pad as compared with another spring when no load is applied.

The vehicle seat disclosed in the present specification further includes at least a chamber whose side close to a surface of the seat cushion is covered by the pad and by which the air blown from the surface of the seat cushion by the pad is allowed to circulate, and a fan which feeds air to the chamber.

What is claimed is:

1. A vehicle seat comprising:
a seat cushion including: a pad; and a support portion which supports the pad, wherein:
the support portion deforms in accordance with a load applied to the pad, and allows sinking of the pad due to the deformation;
a deformation amount per unit load of the support portion, in a first load range equal to or greater than a predetermined load, is smaller than a deformation amount per unit load of the support portion, in a second load range less than the predetermined load, and
the support portion includes:
a front frame disposed on a front side of the seat cushion;
a rear frame disposed on a rear side of the seat cushion;
a plurality of springs which are bridged between the front frame and the rear frame on the lower side of the pad and deflects in accordance with a load applied to the pad; and
an engagement portion which is engaged with one or more of the plurality of springs and changes a deflectable effective length of the spring, based on the deflection of the plurality of springs.

2. The vehicle seat according to claim 1, further comprising:
a chamber whose side close to a surface of the seat cushion is covered by the pad and by which air blown from the surface of the seat cushion through the pad is allowed to circulate; and
a fan which feeds the air to the chamber.

3. The vehicle seat according to claim 1, wherein
the engagement portion is provided on at least one of the front frame and the rear frame, and the intermediate portion of the spring is fastened to the frame.

4. The vehicle seat according to claim 1, wherein
the engagement portion restrains a partial section of the spring in length.

5. A vehicle seat comprising:
   a seat cushion including: a pad; and a support portion which supports the pad, wherein:
   the support portion deforms in accordance with a load applied to the pad, and allows sinking of the pad due to the deformation;
   a deformation amount per unit load of the support portion, in a first load range equal to or greater than a predetermined load, is smaller than a deformation amount per unit load of the support portion, in a second load range less than the predetermined load, and
   the support portion includes:
      a front frame disposed on a front side of the seat cushion;
      a rear frame disposed on a rear side of the seat cushion;
      a plurality of springs which are bridged between the front frame and the rear frame on the lower side of the pad and are deflected in accordance with a load applied to the pad; and
      some of the plurality of springs are spaced apart from the pad as compared with another spring when no load is applied.

6. The vehicle seat according to claim 5, further comprising:
   a chamber whose side close to a surface of the seat cushion is covered by the pad and by which air blown from the surface of the seat cushion through the pad is allowed to circulate; and
   a fan which feeds the air to the chamber.

* * * * *